United States Patent [19]

Antikainen et al.

[11] Patent Number: 4,732,523
[45] Date of Patent: Mar. 22, 1988

[54] SHIP UNLOADING MECHANISM

[75] Inventors: Jorma Antikainen, Hyvinkaa; Matti Sepling, Rajamaki; Jyri Jusslin, Hyvinkaa, all of Finland

[73] Assignee: Kone Oy, Hyvinkaa, Finland

[21] Appl. No.: 917,607

[22] Filed: Oct. 10, 1986

[30] Foreign Application Priority Data

Oct. 29, 1985 [FI] Finland .................................. 854251

[51] Int. Cl.$^4$ ............................................. B65G 67/60
[52] U.S. Cl. .................................... 414/139; 198/509;
198/518
[58] Field of Search ................. 414/139; 198/509, 513,
198/518, 716, 819, 307.1

[56] References Cited

U.S. PATENT DOCUMENTS

| 3,349,892 | 10/1967 | Barre | 414/139 X |
|---|---|---|---|
| 3,720,299 | 3/1973 | Wegmann et al. | |
| 3,755,931 | 9/1973 | Gisler | |
| 4,230,221 | 10/1980 | Beresinsky | 198/513 |

FOREIGN PATENT DOCUMENTS

| 0055879 | 7/1982 | European Pat. Off. | 198/716 |
|---|---|---|---|
| 489914 | 1/1930 | Fed. Rep. of Germany | |
| 702359 | 2/1941 | Fed. Rep. of Germany | |
| 3447498 | 7/1986 | Fed. Rep. of Germany | |
| 55-123823 | 9/1980 | Japan | 414/139 |
| 60-167830 | 8/1985 | Japan | 198/513 |
| 831676 | 5/1981 | U.S.S.R. | |

OTHER PUBLICATIONS

U.S.S.R. "Automation and Mechanizing of Loading and Unloading in Harbours", V. M. Strahov et al, Moscow, Transport, 1981, p. 201, FIG. 143.

Primary Examiner—Leslie J. Paperner
Attorney, Agent, or Firm—Bell & Arkin

[57] ABSTRACT

A ship unloading mechanism has an endless, vertically operating compartmented belt conveyor by which material to be lifted is transported from a ship's hold at the lower end of the conveyor onto a horizontal conveyor at the top end of the conveyor, when the material is further transported e.g. onto a quayside conveyor, etc. At the lower end of the compartmented belt conveyor there is provided a material supplying device which has a vaned wheel, the vanes of which fling the material at high velocity from the hold into upwardly facing compartments of the compartmented belt conveyor.

2 Claims, 6 Drawing Figures

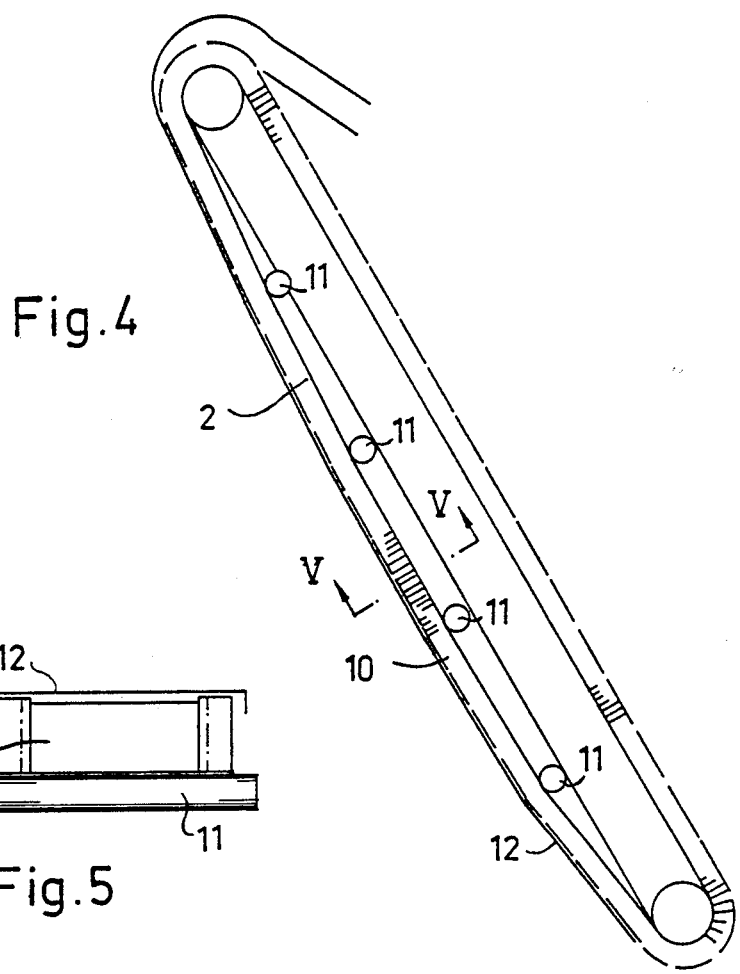
Fig. 4
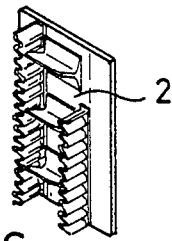
Fig. 5
Fig. 6

SHIP UNLOADING MECHANISM

FIELD OF THE INVENTION

The present invention relates to a ship unloading mechanism having an endless compartmented belt conveyor operating in the vertical direction and with the aid of which material to be lifted is transported from a ship's hold at the lower end of the conveyor onto a horizontal conveyor at the top end of the conveyor, the material being thence further transported e.g. onto a quayside conveyor.

BACKGROUND OF THE INVENTION

It is known in the art to employ various screw unloaders, which have the disadvantages of high friction and, consequently, also rapid wear and which also damage the material being conveyed. So-called sandwich belts are also known in the art, in which case small size is a requirement imposed on the material that is being transported. Furthermore, there are scraper chain conveyors, in which the materials being transported cause wear of the chains. Sticky materials, on the other hand, tend to adhere to the chains.

BRIEF SUMMARY OF THE INVENTION

It is accordingly an object of the present invention to provide a novel and improved ship unloading mechanism.

The present invention provides a ship unloading mechanism, comprising an endless, vertically operating compartmented belt conveyor for transporting material to be lifted up from a ship's hold, said compartmented belt conveyor having upwardly facing compartments for receiving said material, a horizontal conveyor at a top end of said compartmented belt conveyor for receiving said material and for further transporting said material, and means at a lower end of said compartmented belt conveyor for supplying said material to said compartmented belt conveyor, said supplying means comprising vaned wheel means for flinging said material at high velocity from the hold into said upwardly turning compartments of said compartmented belt conveyor.

The present unloading mechanism can operate extremely fast and efficiently because high speed belt conveyors can be employed when the material is supplied in the belt's direction of travel, that is, the belt is not required any more to "tamp" the material in the transporting direction, instead of which the velocity imparted by the vaned wheel means to the material, and its direction, are consistent with the speed and direction of advance of the belt.

As a result of the high belt speeds, high capacity is achieved even with a conveyor construction of small cross-section. Therefore, an unloader of lighter weight is obtained, and this in its turn implies less strain on the quayside structures.

In an advantageous embodiment of the invention screw conveyors are provided at opposite sides of the vaned wheel means, on a common shaft, which detach the material in the ship's hold and transport the material to the vaned wheel means. The material can thus be collected for transport to the vaned wheel means from a very broad area, and from the vaned wheel means it will further fly onto the compartmented belt conveyor.

An upwardly transporting half part of the compartmented belt conveyor is, e.g. with the aid of rollers, forced to assume an outwardly curving configuration equivalent to the belt's dip at its maximum negative unloading angle, and a cover sheet belonging to the compartmented belt is similarly curvilinearly shaped and immediately adjacent to the compartmented belt. Thereby, the upwardly transporting part of the compartmented belt is enabled to travel along a given curve and it is not compelled to rub against the cover sheet when the unloading angle is negative. In other words, the upwardly transporting part of the compartmented belt is located below the part of the compartmented belt which is running downwards. Since the belt conveyor is preferably made of rubber, even unloading of difficult materials becomes possible.

BRIEF DESCRIPTION OF THE DRAWINGS

Further features, objects and advantages of the invention will be apparent to those skilled in the art from the following description of the invention with reference to the accompanying drawings, wherein:

FIG. 4 shows the compartmented belt conveyor of the unloading mechanism at a so-called negative unloading angle;

FIG. 5 shows a section along the line V—V of FIG. 4; and

FIG. 6 shows a part of the compartmented belt.

DESCRIPTION OF THE PREFERRED EMBODIMENT

Figure 1:
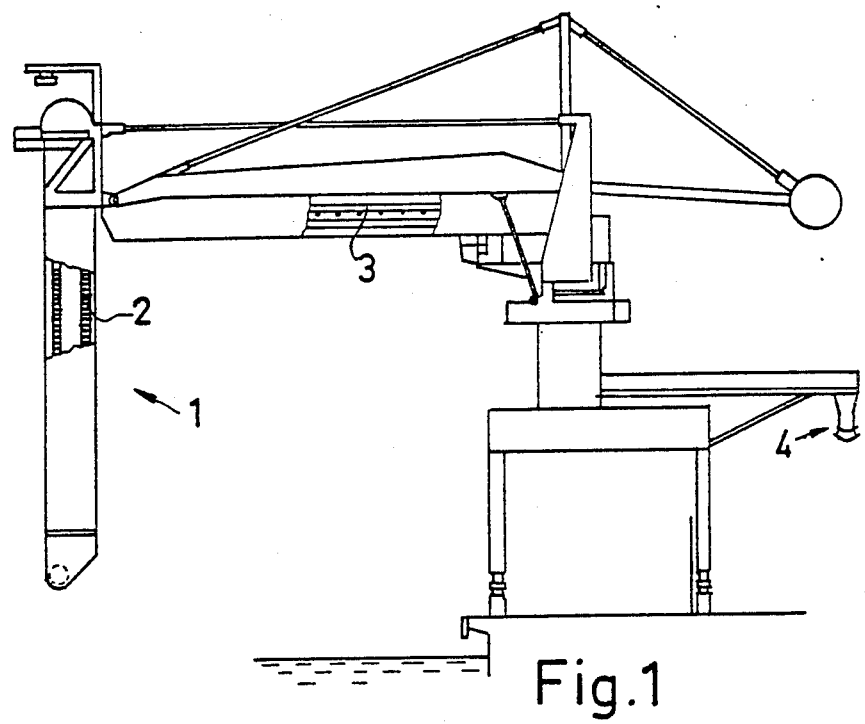
FIG. 1 shows a ship unloading mechanism according to the present invention and a crane.
Figures 2, 3:
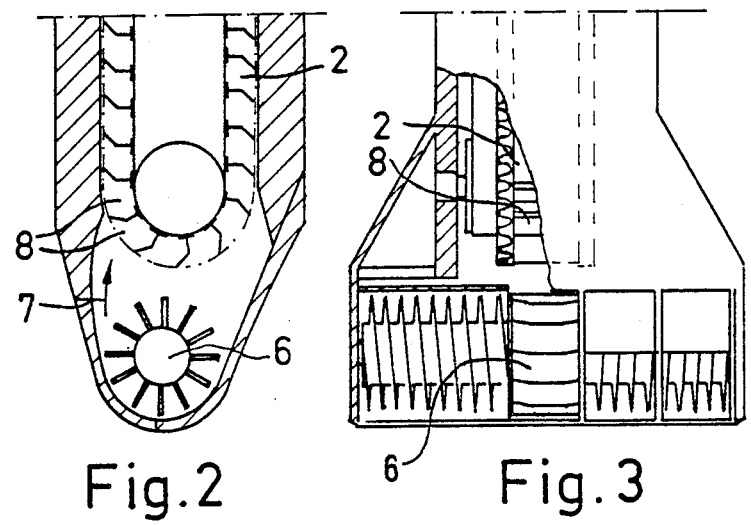
FIG. 2 shows the lower end of the unloading mechanism in vertical section.
FIG. 3 shows the lower end of the unloading mechanism in front view and partly broken away in section.

The unloading mechanism indicated generally by reference numeral 1 comprises an endless, vertically operating compartmented belt conveyor 2, by the aid of which material to be lifted will be transported from a ship's hold (not shown) onto a horizontal conveyor 3 located at the top end of the compartmented belt conveyor 2, whence the material is further transported to a quayside conveyor 4, etc.

At the lower end of the compartmented belt conveyor 2, there is provided a material supplying means comprising a vaned wheel 6, the vanes of which fling the material at high velocity, in the direction indicated by an arrow 7, into upwardly turned compartments 8 of the compartmented belt conveyor 2.

At opposite sides of the vaned wheel 6, on the same shaft as the vaned wheel, have been provided screw conveyors 9, which detach the material in the ship's hold and transport the material to the vaned wheel 6. An upwardly transporting conveyor run 10 of the compartmented belt conveyor 2 is urged by means of rollers 11 to assume an outwardly curving shape which is consistent with the belt's sag when at its maximum negative unloading angle.

A cover sheet 12 belonging to the compartmented belt conveyor 2 is in corresponding manner curvilinearly shaped and immediately adjacent the compartments of the belt. Therefore, the material will travel enclosed in these compartments, whatever the angle at which the compartmented belt conveyor is positioned.

It will be apparent to those skilled in the art that the invention is not confined to the examples presented in the foregoing and that it may vary within the scope of the appended claims.

We claim:

1. A ship unloading mechanism, comprising:

an endless, vertically operating compartmented belt conveyor for transporting material to be lifted up from a ship's hold;

said compartmented belt conveyor having upwardly facing compartments for receiving said material;

a horizontal conveyor at a top end of said compartmented belt conveyor for receiving said material and for further transporting said material; and means at a lower end of said compartmented belt conveyor for supplying said material to said compartmented belt conveyor;

said supplying means comprising vaned wheel means for flinging said material at high velocity from the hold into said upwardly facing compartments of said compartmented belt conveyor;

said compartmented belt conveyor further having an upwardly transporting conveyor run which has an outwardly curving shape consistent with the sag of said belt conveyor when said belt conveyor is at its maximum negative unloading angle, means defining a cover having a similarly outwardly curving shape adjacent said compartments and roller means for urging said upwardly transporting conveyor run to assume the outwardly curving shape.

2. A ship unloading mechanism according to claim 1, wherein said vaned wheel means comprise a shaft and vanes rotatable about said shaft and wherein screw conveyor means are located on said shaft at opposite sides of said vanes for detaching said material in the ship's hold and transporting said material to said vanes.

* * * * *